(12) United States Patent  (10) Patent No.: US 8,205,028 B1
Sakarda  (45) Date of Patent: *Jun. 19, 2012

(54) ADAPTIVE BUS PROFILER

(75) Inventor: Premanand Sakarda, Acton, MA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,734

(22) Filed: Apr. 22, 2011

Related U.S. Application Data

(63) Continuation of application No. 12/182,014, filed on Jul. 29, 2008, now Pat. No. 7,949,817.

(60) Provisional application No. 60/952,990, filed on Jul. 31, 2007, provisional application No. 60/956,561, filed on Aug. 17, 2007.

(51) Int. Cl.
*G06F 13/40* (2006.01)
*G06F 13/42* (2006.01)
*G06F 1/00* (2006.01)

(52) U.S. Cl. ............... 710/307; 710/6; 710/15; 710/18; 710/29; 710/105; 710/107; 713/300; 713/320; 713/324

(58) Field of Classification Search ............. 710/6, 307, 710/105, 107, 29
See application file for complete search history.

(56) References Cited

U.S. PATENT DOCUMENTS

| | | | |
|---|---|---|---|
| 4,611,299 A | 9/1986 | Hori et al. | |
| 4,823,340 A | 4/1989 | Grassman et al. | |
| 5,260,905 A | 11/1993 | Mori | |
| 5,307,343 A | 4/1994 | Bostica et al. | |
| 5,440,523 A | 8/1995 | Joffe | |
| 5,680,595 A | 10/1997 | Thomann et al. | |
| 5,719,890 A | 2/1998 | Thomman et al. | |
| 5,778,007 A | 7/1998 | Thomann et al. | |
| 5,802,131 A | 9/1998 | Morzano | |
| 5,815,447 A | 9/1998 | Thomann | |
| 5,875,470 A | 2/1999 | Dreibelbis et al. | |
| 5,953,340 A | 9/1999 | Scott et al. | |
| 5,996,051 A | 11/1999 | Mergard | |
| 6,021,086 A | 2/2000 | Joffe et al. | |
| 6,034,957 A | 3/2000 | Haddock et al. | |
| 6,067,301 A | 5/2000 | Aatresh | |
| 6,081,528 A | 6/2000 | Thomann | |
| 6,115,389 A | 9/2000 | Mahale et al. | |
| 6,160,814 A | 12/2000 | Ren et al. | |
| 6,167,491 A | 12/2000 | McAlpine | |
| 6,216,205 B1 | 4/2001 | Chin et al. | |
| 6,230,191 B1 | 5/2001 | Walker | |

(Continued)

FOREIGN PATENT DOCUMENTS

FR  2779843  12/1999

(Continued)

OTHER PUBLICATIONS

"Final Office Action", U.S. Appl. No. 12/182,014, (Oct. 29, 2010), 16 pages.

(Continued)

*Primary Examiner* — Brian Misiura

(57) ABSTRACT

An adaptive bus profiler is described. In embodiment(s), data traffic that is communicated on an adaptive bus can be monitored, and projected data traffic that is scheduled for communication via the adaptive bus can be determined. An adaptive bus profile can be determined based on the data traffic and the projected data traffic. A reconfiguration of a bus width of the adaptive bus can be initiated based on the adaptive bus profile.

22 Claims, 6 Drawing Sheets

U.S. PATENT DOCUMENTS

| | | | |
|---|---|---|---|
| 6,370,624 B1 | 4/2002 | Ajanovic et al. | |
| 6,446,173 B1 | 9/2002 | Pham | |
| 6,487,207 B1 | 11/2002 | Thomann | |
| 6,535,939 B1 | 3/2003 | Arimilli et al. | |
| 6,535,963 B1 | 3/2003 | Rivers | |
| 6,539,488 B1 | 3/2003 | Tota et al. | |
| 6,618,390 B1 | 9/2003 | Erimli et al. | |
| 6,712,704 B2 | 3/2004 | Eliott | |
| 6,714,643 B1 | 3/2004 | Gargeya et al. | |
| 6,732,184 B1 | 5/2004 | Merchant et al. | |
| 6,741,589 B1 | 5/2004 | Sang et al. | |
| 6,785,272 B1 | 8/2004 | Sugihara | |
| 7,039,781 B2 | 5/2006 | Iwata et al. | |
| 7,068,651 B2 | 6/2006 | Schmidt et al. | |
| 7,099,325 B1 | 8/2006 | Kaniz et al. | |
| 7,130,308 B2 | 10/2006 | Haddock et al. | |
| 7,136,953 B1 | 11/2006 | Bisson et al. | |
| 7,149,834 B2 | 12/2006 | Peters et al. | |
| 7,185,132 B2 | 2/2007 | Tang | |
| 7,197,591 B2 | 3/2007 | Kwa et al. | |
| 7,249,270 B2 | 7/2007 | Mansell et al. | |
| 7,329,136 B2 | 2/2008 | Su et al. | |
| 7,334,072 B1 | 2/2008 | Wright | |
| 7,359,997 B2 | 4/2008 | Ishida et al. | |
| 7,447,824 B2 | 11/2008 | Jabori et al. | |
| 7,451,280 B2 | 11/2008 | Furtek et al. | |
| 7,469,311 B1 | 12/2008 | Tsu et al. | |
| 7,478,188 B2 | 1/2009 | Patton | |
| 7,480,757 B2 | 1/2009 | Atherton et al. | |
| 7,480,808 B2 | 1/2009 | Caruk et al. | |
| 7,496,707 B2 | 2/2009 | Freking et al. | |
| 7,536,490 B2 | 5/2009 | Mao | |
| 7,539,809 B2 | 5/2009 | Juenger | |
| 7,571,287 B2 | 8/2009 | Lee et al. | |
| 7,583,600 B1 | 9/2009 | Schanke et al. | |
| 7,606,960 B2 | 10/2009 | Munguia | |
| 7,624,221 B1 * | 11/2009 | Case | 710/310 |
| 7,660,925 B2 | 2/2010 | Larson et al. | |
| 7,685,322 B2 | 3/2010 | Bhesania et al. | |
| 7,689,753 B2 | 3/2010 | Kwak et al. | |
| 7,752,342 B2 | 7/2010 | Tee et al. | |
| 7,949,817 B1 | 5/2011 | Sakarda | |
| 2001/0036116 A1 | 11/2001 | Kubo et al. | |
| 2003/0154314 A1 | 8/2003 | Mason, Jr. et al. | |
| 2004/0093389 A1 | 5/2004 | Mohamed et al. | |
| 2004/0193774 A1 | 9/2004 | Iwata et al. | |
| 2005/0268001 A1 | 12/2005 | Kimelman et al. | |
| 2006/0075144 A1 | 4/2006 | Challener et al. | |
| 2006/0106962 A1 | 5/2006 | Woodbridge et al. | |
| 2008/0148083 A1 | 6/2008 | Pesavento et al. | |
| 2008/0215773 A1 | 9/2008 | Christison et al. | |
| 2008/0215774 A1 | 9/2008 | Kim et al. | |
| 2008/0320189 A1 | 12/2008 | Arssov | |

FOREIGN PATENT DOCUMENTS

| | | |
|---|---|---|
| JP | 1162294 | 6/1989 |
| JP | 4061094 | 2/1992 |
| JP | 5047174 | 2/1993 |
| JP | 10506776 | 6/1998 |
| JP | 2004288355 | 10/2004 |

OTHER PUBLICATIONS

"Non Final Office Action", U.S. Appl. No. 12/182,014, 13 pages.

"Notice of Allowance", U.S. Appl. No. 12/182,014, (Jan. 20, 2011), 6 pages.

"6-Port Fast Ethernet Switch, 88E6060 (Product Overview)", *Link Street*; www.marvell.com; *Marvell Semiconductor, Inc.*; Sunnyvale, CA, (2002), 2 pgs.

"7-Port Fast Ethernet Switch with 802.1 Q, 88E6063 (Product Overview)", www.marvell.com; *Marvell Semiconductor, Inc.*; Sunnyvale, CA, (2002), 2 pgs.

"Advisory Action", U.S. Appl. No. 10/702,744, (Sep. 11, 2007), 3 pages.

"Advisory Action", U.S. Appl. No. 12/163,801, (Jan. 24, 2011), 2 pages.

"European Communication and Search Report", Application No. EP04006012; European Patent Office; Munich, Germany, (May 30, 2005), 4 pgs.

"European Search Report", Application No. EP04006012; Munich, Germany, (May 30, 2005), 4 pages.

"Final Office Action", U.S. Appl. No. 10/702,744, (Jun. 25, 2007), 13 pages.

"Final Office Action", U.S. Appl. No. 12/163,801, (Oct. 14, 2010), 12 pages.

"Final Office Action", U.S. Appl. No. 12/163,801, (Nov. 14, 2011), 12 pages.

"Final Office Action", U.S. Appl. No. 12/434,000, (Apr. 26, 2011), 15 pages.

"Final Office Action", U.S. Appl. No. 12/494,076, (Mar. 30, 2011), 13 pages.

"Final Office Action", U.S. Appl. No. 12/494,076, (Oct. 3, 2011), 13 pages.

"Foreign Office Action", Japanese Application No. 2004-071574, (Feb. 19, 2008), 4 pages.

"Foreign Office Action", Japanese Application No. 2008-270813, (May 26, 2011), 4 pages.

"Information Technology—Telecommunications and Information Exchange Between Systems—Local and Metropolitan Area Networks—Specific Requirements", *IEEE*, Wireless LAN Medium Access Control (MAC) and Physical Layer (PHY) Specifications, (Aug. 20, 1999), 531 pages.

"Link Street 88E6063 7-Port Fast Ethernet Switch with QoS, 802.1Q VLAN, and Virtual Cable Tester (VCT) Technology", *Marvell: News*; www.marvell.com; *Marvell Semiconductor, Inc.*; Sunnyvale, CA, (Jul. 14, 2003), 1 page.

"Link Street 88E6181 8-Port Gigabit Ethernet Switch with Four-Level QoS", *Marvell: News*; www.marvell.com; *Marvell Semiconductor, Inc.*; Sunnyvale, CA, (Jul. 14, 2003), 1 page.

"Link Street, Integrated Gateway Router with Multi-Port QoS Switch 88E6218 (Product Overview)", *Gateway Solutions*; www.marvell.com; *Marvell Semiconductor, Inc.*; Sunnyvale, CA, (2003), 2 pgs.

"Link Street, Integrated Gateway Router with Multi-Port Switch, 88E6208 (Product Overview)", *Gateway Solutions*; www.marvell.com; *Marvell Semiconductor, Inc.*; Sunnyvale, CA, (2003), 2 pgs.

"Marvell Link Street Gigabit Ethernet Switches Enable the Rapid Deployment of Gigabit Connectivity for the SOHO Market", *Marvell: Press and Investor News; Marvell Semiconductor, Inc.*; Sunnyvale, CA; http://www.marvell.com/press/pressNewsDisplay.do?releaseID=347, (Apr. 29, 2003), 2 pgs.

"Method and Circuit for Transferring Data with Dynamic Parity Generation and Checking Scheme in Multi-port DRAM", esp@cenet; Publication No. JP10506776T (Abstract of Corresponding Document No. US5778007); esp@cenet Database—Worldwide; http://v3.espacenet.com/textdoc?DB=EPODOC&IDX=JP10506776T&F=0, (Jun. 30, 1998), 5 pages.

"Multiport Component Memory Series and Application with a Computer", *Automated Translation; Europaisches Patentamt, European Patent Office, Office Europeen Des Brevets; Description of FR2779843; World Lingo Language Translation Services*; www.worldlingo.com, (Nov. 19, 2007), 15 pgs.

"Non-Final Office Action", U.S. Appl. No. 10/702,744, (Feb. 19, 2005), 5 pages.

"Non-Final Office Action", U.S. Appl. No. 10/702,744, (Dec. 27, 2006), 10 pages.

"Non-Final Office Action", U.S. Appl. No. 12/163,801, (Apr. 22, 2010), 10 pages.

"Non-Final Office Action", U.S. Appl. No. 12/163,801, (Jul. 20, 2011), 11 pages.

"Non-Final Office Action", U.S. Appl. No. 12/434,000, (Nov. 10, 2010), 9 pages.

"Non-Final Office Action", U.S. Appl. No. 12/436,577, (Sep. 29, 2010), 6 pages.

"Non-Final Office Action", U.S. Appl. No. 12/494,076, (Dec. 22, 2010), 12 pages.

"Notice of Allowance", U.S. Appl. No. 10/702,744, (Mar. 27, 2009), 7 pages.

"Notice of Allowance", U.S. Appl. No. 12/436,577, (Apr. 14, 2011), 4 pages.

"Partial European Search Report", Application No. EP04006012; European Patent Office, Munich, Germany, (Mar. 14, 2005), 2 pgs.

"Restriction Requirement", U.S. Appl. No. 10/702,744, (Jun. 30, 2006), 5 pages.

Litaize, Daniel et al., "Serial Multi Port Memory Component Comprising RAM Memory Bank Assemblies for Use in Computer", Abstract of FR2779843; Publication No. FR2779843; esp@cenet_database; http://v3.espace.com/textdoc?DB=EPODOC&IDX=FR2779843&F=0, (Dec. 12, 1999), 1 page.

Mori, Toshiki "Multiport Memory", English Abstract of Japanese Patent Publication No. JP5047174; esp@cenet database—Worldwide, (Feb. 26, 1993), 1 page.

Pallampati, Amarnath "iSCSI Performance Over RDMA-Enabled Network", *Thesis, Department of Electrical and Computer Engineering, Graduate School of Wichita State University*, (Jul. 2006), 58 pages.

Prince, Betty "High Performance Memories, New Architectures DRAMS and SRAMs—Evolution and Function", *John Wiley & Sons, Ltd.*; West Sussex, England, (1996), pp. 58-61.

"Foreign Office Action", Japanese Application No. 2008-270813, (Apr. 3, 2012), 6 pages.

"Non-Final Office Action", U.S. Appl. No. 12/434,000, (May 4, 2012), 15 pages.

"Notice of Allowance", U.S. Appl. No. 12/163,801, (Mar. 22, 2012), 6 pages.

* cited by examiner

ADAPTIVE BUS PROFILER

This application is a continuation of and claims priority application Ser. No. 12/182,014, filed Jul. 29, 2008, now to U.S. Utility Pat. No. 7,949,817, entitled "Adaptive Bus Profiler" to Sakarda and also claims priority to U.S. Provisional Patent Application Ser. No. 60/952,990 filed Jul. 31, 2007, entitled "I/O Profiler and I/O Adaptive Bus" to Sakarda, and additionally claims priority to U.S. Provisional Patent Application Ser. No. 60/956,561 filed Aug. 17, 2007, entitled "I/O Profiler and I/O Adaptive Bus" to Sakarda, the disclosures of which are incorporated by reference herein in their entirety.

BACKGROUND

System-on-chip (SoC) integrated circuits are being utilized in smaller and/or increasingly complex consumer electronic devices, such as cell phones, media players, digital cameras, network equipment, and the like. Typically, all or most of the electronic circuitry, a microprocessor, memory, input-output (I/O) logic control, communication interfaces and components, other hardware, firmware, and/or software needed to run an entire device can be integrated within an SoC. The components of an SoC can be coupled with a data bus for data communication between the components. The data bus is designed for an SoC implementation, and the bandwidth configuration is a set design (e.g., a data bit width of 16 bits, 32 bits, 64 bits, etc. for the data bus) to handle the data traffic for a particular device in the SoC. In some implementations of a data bus, the bus width may be selected to conserve device power which may then impact device performance. Alternatively, the bus width of a data bus in an SoC may be increased for performance at the expense of power consumption.

SUMMARY

This summary is provided to introduce concepts of an adaptive bus profiler. The concepts are further described below in the Detailed Description. This summary is not intended to identify essential features of the claimed subject matter, nor is it intended for use in determining the scope of the claimed subject matter.

In embodiment(s) of adaptive bus profiler, an adaptive bus profile system includes a bus profile service and a state machine. The bus profile service can monitor data traffic when communicated on an adaptive bus; determine projected data traffic that is scheduled for communication via the adaptive bus; and determine an adaptive bus profile based on the data traffic and the projected data traffic. The state machine can then initiate reconfiguring a bus width of the adaptive bus based on the adaptive bus profile.

In other embodiments(s), a method is implemented to monitor data traffic that is communicated on an adaptive bus, and to determine projected data traffic that is scheduled for communication via the adaptive bus. An adaptive bus profile is determined based on the data traffic and the projected data traffic. Reconfiguration of a bus width of the adaptive bus is then initiated based on the adaptive bus profile.

In other embodiment(s), an adaptive bus profile system can monitor data traffic when communicated on an adaptive bus; determine projected data traffic that is scheduled for communication via the adaptive bus; and determine an adaptive bus profile based on the data traffic and the projected data traffic. The adaptive bus profile system can then initiate reconfiguring a bus width of the adaptive bus based on the adaptive bus profile.

BRIEF DESCRIPTION OF THE DRAWINGS

Embodiments of an adaptive bus profiler are described with reference to the following drawings. The same numbers are used throughout the drawings to reference like features and components.

DETAILED DESCRIPTION

Embodiments of an adaptive bus profiler provide that a system-on-chip (SoC) can be designed and implemented with an adaptive bus that can be configured to conserve power in a consumer electronic device, such as a cell phone, media player, digital camera, and the like. The adaptive bus can be implemented to couple the components of an SoC for data communication between the components, and can have a variable bus width configuration (e.g., a width of 16 bits, 32 bits, 64 bits, 128 bits, etc.). The bus width can be dynamically configured to handle the data traffic for a particular device in the SoC. For example, the bus width can be decreased when data traffic is light such that an operating frequency and operating voltage are reduced, thereby reducing power consumption and conserving battery power in a portable electronic device. Alternatively, if the data traffic increases, the bus width can be increased for performance and data throughput.

While features and concepts of the described systems and methods of an adaptive bus profiler can be implemented in any number of different environments, systems, networks, and/or various configurations, embodiments of an adaptive bus profiler are described in the context of the following example networks and environments.

Figure 1:
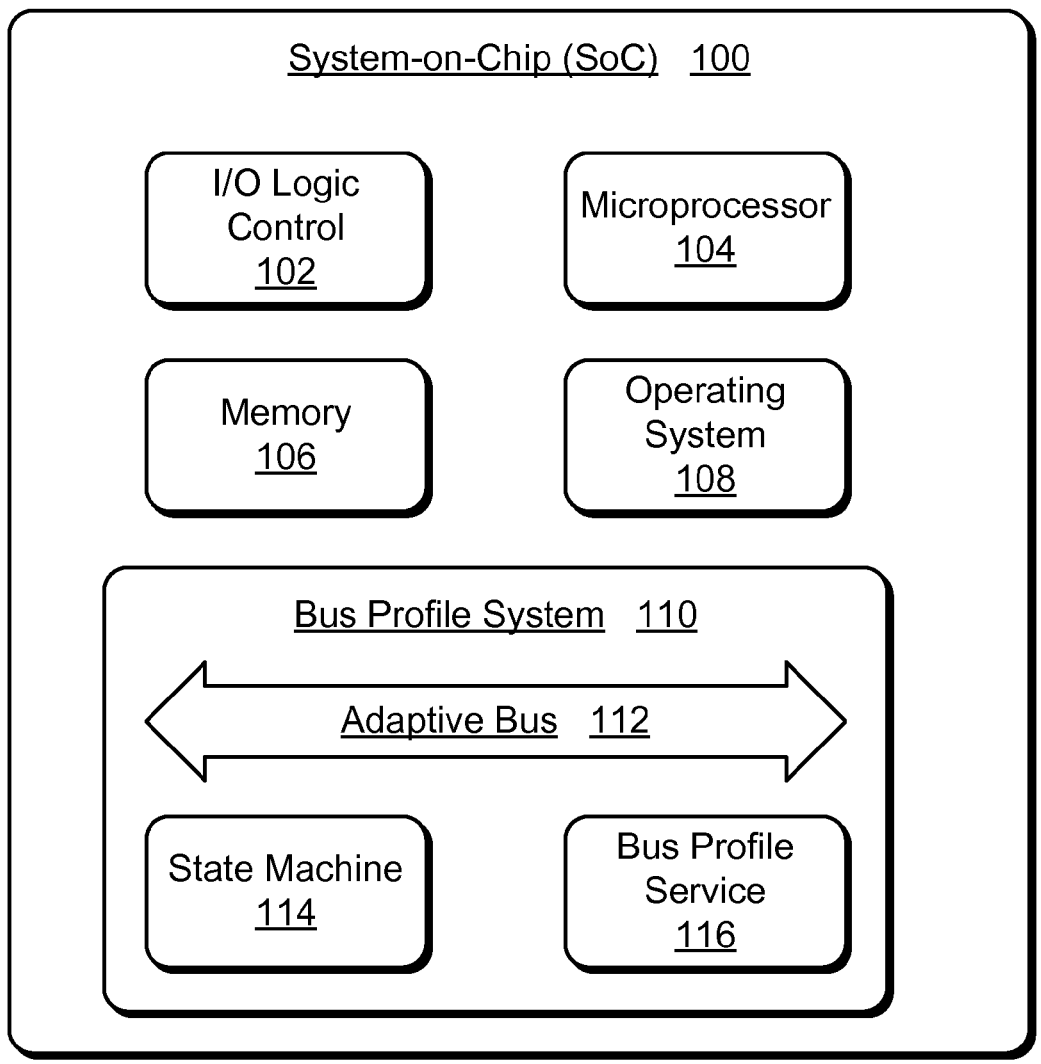
FIG. 1 illustrates an example system-on-chip (SoC) as an environment in which embodiments of an adaptive bus profiler can be implemented.

FIG. 1 illustrates an example system-on-chip (SoC) 100 which can implement various embodiments of an adaptive bus profiler in any type of consumer electronic device. An SoC can be implemented in any type of fixed or mobile device, such as any one or combination of a media device, computer device, telephone (e.g., cellular, VoIP, WiFi, etc.), high definition television (HDTV), television set-top box, appliance device, gaming device, electronic device, digital camera, GPS navigation device, vehicle, workstation, access point, and/or in any other type of device. In addition, a device implemented with SoC 100 may also be implemented with any number and combination of differing components as further described with reference to the example device shown in FIG. 6.

In this example, the SoC 100 includes various components such as an input-output (I/O) logic control 102 (e.g., to include electronic circuitry, generally) and a microprocessor 104 (e.g., any of a microcontroller, digital signal processor, etc.). The SoC 100 also includes a memory 106 which may be any type of random access memory (RAM), a low-latency nonvolatile memory such as flash memory, read only memory (ROM), and/or other suitable electronic data storage. The SoC 100 may also include various firmware and/or software, such as an operating system 108 which can be computer-executable instructions maintained by memory 106 and executed by microprocessor 104. The SoC 100 may also include other various communication interfaces and components, wireless LAN (WLAN) components, other hardware, firmware, and/or software.

In this example, the SoC 100 includes a bus profile system 110 which can implement various embodiments of adaptive bus profiler. The bus profile system 110 includes an adaptive bus 112 (also referred to as an "adaptive data bus"), an associated state machine 114, and a bus profile service 116. The adaptive bus 112 can be any type of data bus, such as an I/O bus or memory bus, that couples the various components of SoC 100 for data communication between the components, and that has a configurable bus width for data transfer. The adaptive bus 112 can be implemented as any one or combination of different bus structures, such as a memory bus or memory controller, an advanced system bus, a peripheral bus, a universal serial bus, and/or a processor or local bus that utilizes any of a variety of bus architectures.

In one or more embodiments, a bus width of the adaptive bus 112 can be configurable based on both current data traffic and projected data traffic between the components of SoC 100 and/or in a particular device in which the SoC is implemented. Depending on the performance requirements for the current and projected data traffic, the bus width can be increased or decreased to any one of several data widths (e.g., 16 bits, 32 bits, 64 bits, 128 bits, etc.) as applicable. For light data traffic, the bus width can be decreased, thereby reducing power consumption and conserving battery power in a portable electronic device. If the current and projected data traffic increases, the bus width can be increased to meet the performance requirements of the data transactions. The bus width of the adaptive bus 112 can be dynamically adjusted based on the current and projected data traffic.

In one or more embodiments, the state machine 114 of the bus profile system 110 in the SoC 100 maintains the operating state of the adaptive bus 112, such as with configuration registers, and controls the operational configuration of the adaptive bus. The state machine 114 can be implemented to reconfigure the adaptive bus width, operating frequency, and/or operating voltage to balance performance and data throughput requirements with the power saving needs of a device in which the SoC 100 is implemented. In an implementation, the state machine 114 can control, or otherwise activate and/or disable, data lines of the adaptive bus 112 with tri-state control circuit logic.

The bus profile service 116 in the SoC 100 may be implemented as computer-executable instructions maintained by memory 106 and executed by microprocessor 104 to implement various embodiments and/or features of an adaptive bus profiler. The bus profile service 116, as well as other functionality described to implement embodiments of an adaptive bus profiler, can also be provided as a service apart from the SoC 100. Alternatively and/or in addition, the bus profile service 116 may be implemented as any one or combination of hardware, firmware, or fixed logic circuitry that is implemented in connection with the I/O logic control 102 and/or other signal processing and control circuits of the SoC 100.

In one or more embodiments, the bus profile service 116 can be implemented to monitor the current data traffic when communicated on the adaptive bus 112, and determine the projected data traffic that is scheduled for communication via the adaptive bus. The bus profile service 116 can also determine an adaptive bus profile based on a quantity of the current data traffic and the projected data traffic. The bus profile service 116 can then initiate dynamically configuring the adaptive bus 112 based on the current and projected data traffic activity and performance requirements.

The bus profile service 116 can initiate adjustments of the adaptive bus parameters to reconfigure the data bus, such as an increase or decrease in the data bus width, an increase or decrease of the operating frequency, and/or an increase or decrease of the operating voltage of the adaptive bus. For example, if the bus width is changed from a 32 bit to a 64 bit data rate, the operating frequency may be increased from 100 MHz to 200 MHz, and the operating voltage may be increased accordingly, such as from 1.0 volt to 1.1 volts. This example is merely illustrative, and any of the operating frequency and/or voltage parameters may vary when implemented. In general, the bus profile service 116 can initiate an increased bus width and an increased operating frequency of the adaptive bus, and then adjust the operating voltage based on the increased bus width and the increased operating frequency. Similarly, the bus profile service 116 can initiate a decreased bus width and a decreased operating frequency of the adaptive bus, and then adjust the operating voltage of the adaptive bus based on the decreased bus width and the decreased operating frequency.

Figure 2:
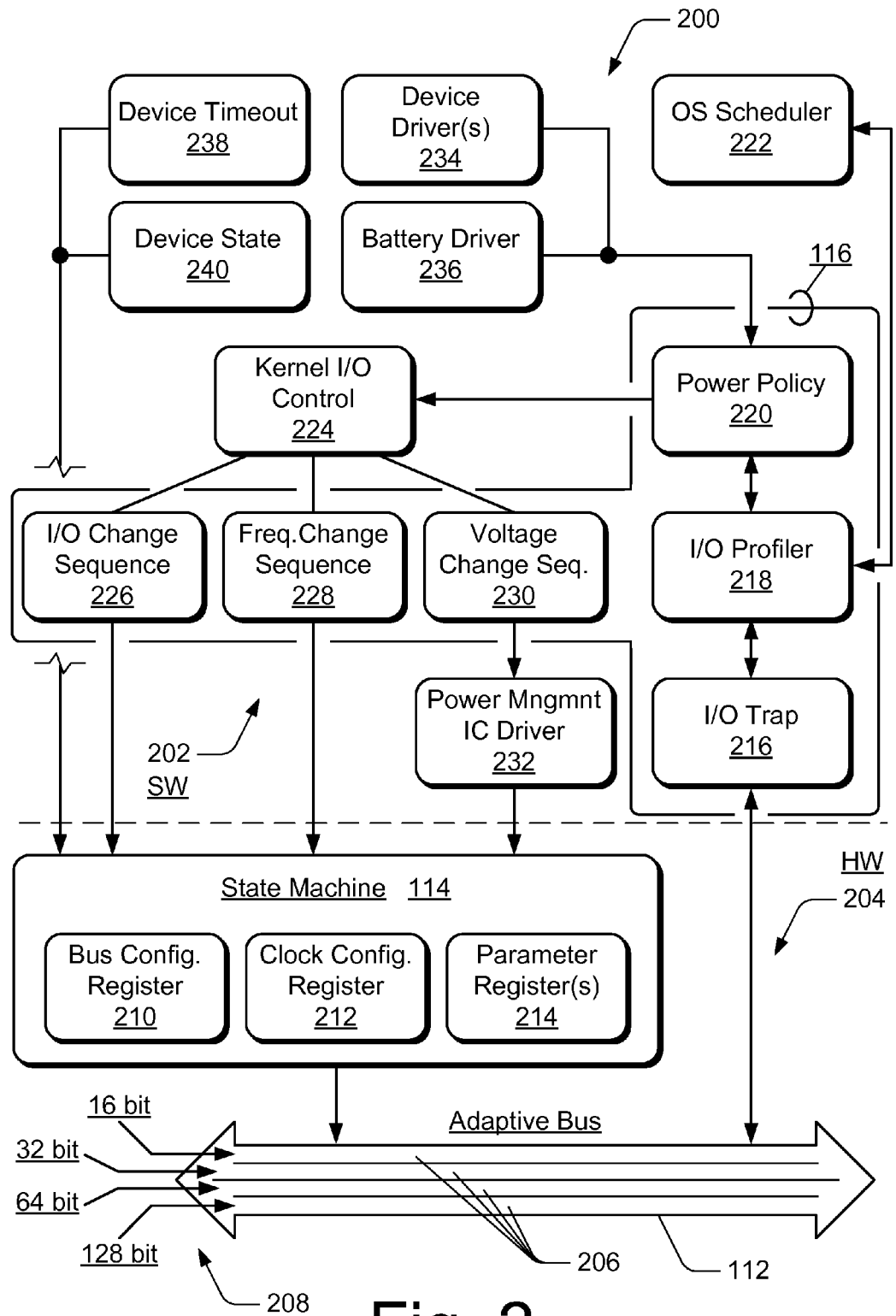
FIG. 2 illustrates an example bus profile system in which embodiments of an adaptive bus profiler can be implemented.

FIG. 2 illustrates an example bus profile system 200 in which various embodiments of an adaptive bus profiler can be implemented. The bus profile system 200 includes examples of the previously described adaptive bus 112, state machine 114, and bus profile service 116. The bus profile system 200 includes software components and/or functionality identified generally at 202, which also includes the bus profile service 116. In addition, the bus profile system 200 includes hardware components identified generally at 204, which also includes the adaptive bus 112 and the state machine 114.

In the example system 200, the adaptive bus 112 couples the various components of system 200 for data communication between the components, and has configurable bus widths for data transfer. The adaptive bus 112 can be implemented with configurable bus widths 206 that correlate to various data rates 208 (e.g., 16 bits, 32 bits, 64 bits, 128 bits, etc.).

In the example system 200, the state machine 114 includes a bus configuration register 210, a clock configuration register 212, and other various bus parameter register(s) 214. The registers are utilized by the state machine 114 to maintain the operating state of the adaptive bus 112, and to control the operational configuration of the adaptive bus. The bus configuration register 210 maintains the bus width parameter for the adaptive bus 112. The clock configuration register 212 maintains the clock for the adaptive bus 112, and the clock can be adjusted dynamically based on the bus width parameter that is maintained by the bus configuration register 210.

In one or more embodiments, the state machine 114 can suspend the data traffic on the adaptive bus 112 to reconfigure the bus width, operating frequency, and/or operating voltage of the adaptive bus based on the configuration and parameter registers. Initially, the state machine 114 can allow current bus transactions (e.g., read and write data transactions, I/O data communication, etc.) to be completed and then hold pending data transactions in a state machine queue for a few nanoseconds (e.g., approximately five nanoseconds or less). The state machine 114 can save or maintain the configuration state of the adaptive bus 112, such as with the various parameter registers 214 (e.g., timing parameters, mode information, configuration information, etc.), and then reconfigure the bus width, operating frequency, and/or operating voltage of the adaptive bus. The state machine 114 can then resume the data transactions to reinitiate communication of the data traffic via the adaptive bus.

In the example system 200, the bus profile service 116 includes an I/O trap 216, an I/O profiler 218, and a power policy 220. The I/O trap 216 can be initiated to monitor data transactions and/or data traffic volume on a designated or selected adaptive bus, and can also be initiated by the I/O profiler 218 to monitor data traffic for a specific address. In this example, the I/O trap 216 monitors the current data traffic that is communicated on adaptive bus 112, and provides the monitored information as an input to the I/O profiler 218.

The I/O profiler 218 also receives input from an operating system scheduler 222 to determine the projected data traffic that is scheduled for communication via the adaptive bus 112. The scheduler 222 can determine the projected data traffic from parameters for a data transaction schedule that are stored in a lookup table at the operating system scheduler. The parameters from which to determine the projected data traffic include a quantity of processor threads that are associated with the adaptive bus (e.g., pending and/or active queued threads), a priority of each of the processor threads, and an expected duration of each of the processor threads.

The I/O profiler 218 periodically profiles the adaptive bus 112 based on the quantity of the current data traffic at time "t" and based on the projected data traffic at time "t+1". The bus profile service 116 can then determine an adaptive bus profile for the bus width, operating frequency, and/or operating voltage based on the current data traffic, projected data traffic, and/or performance requirements of the adaptive bus 112. The I/O profiler can also regulate the periodic profiling of the adaptive bus 112 so as not to be constantly changing the bus configuration parameters causing the data traffic on the adaptive bus to be delayed. An adaptive profile window can be configured between approximately 10 milliseconds (ms) and 500 ms to designate the profile occurrence.

The power policy 220 can receive an input of configuration parameters for the adaptive bus from the I/O profiler 218, such as the bus width (e.g., 16 bits, 32 bits, 64 bits, 128 bits, etc.), the operating frequency, and the operating voltage of the adaptive bus 112. The power policy 220 can then initiate a procedure call to a kernel I/O control 224 and provide the configuration parameters as operating sequence changes to reconfigure the adaptive bus 112. For example, the power policy 220 provides the bus width data rate as an I/O change sequence 226, the operating frequency as a frequency change sequence 228, and the operating voltage as a voltage change sequence 230.

The operating sequence changes can then be communicated from the kernel I/O control 224 to the state machine 114 that controls operation of the adaptive bus 112. In an embodiment, the I/O change sequence 226 is received at the state machine 114 and maintained as the bus width parameter with the bus configuration register 210. The frequency change sequence 228 is received at the state machine 114 and maintained as the operating frequency of the adaptive bus with the clock configuration register 212. The voltage change sequence 230 is received at the state machine 114 via a power management integrated-circuit (IC) driver 232 that provides voltage configuration and regulation for the adaptive bus 112, and for other components of the example bus profile system 200.

In one or more embodiments, component drivers in the system 200 can provide input to the power policy 220. For example, a device driver 234 can register with the power policy 220 and initiate a profile of a particular adaptive bus in the system 200 (e.g., assuming the system 200 includes more than the one adaptive bus 112). The I/O profiler 218 can then initiate that the I/O trap 216 monitor the designated adaptive bus.

In another embodiment, the power policy 220 of the bus profile service 116 may receive a battery input from a battery driver 236 that indicates a low power condition. The power policy 220 can then override any other adaptive bus profiles received from the I/O profiler to conserve power in a device in which the example bus profile system 200 is implemented. For a low battery input from the battery driver 236, the power policy 220 can initiate a decrease in the bus width of the adaptive bus 112, a decrease in the operating frequency of the adaptive bus, and a correlating decrease in the operating voltage to conserve the battery power.

The example bus profile system 200 also includes a device timeout input 238 and a device state input 240 to the state machine 114. The device timeout input 238 is an indication that informs the adaptive bus profiler that a device is no longer active on the adaptive bus 112. There can be several devices on the adaptive bus 112. The state machine 114 can be saved and restored so that if the adaptive bus is dynamically configured, the device resumes with the new configuration.

The arrowed connections shown in the example system 200 are merely exemplary to depict the communication links and/or connections between the various components, functions, and/or modules of the system. It is contemplated that any one or more of the arrowed communication links facilitate two-way data communication, such as between the I/O profiler 218 and the power policy 220.

Example methods 300, 400, and 500 are described with reference to respective FIGS. 3-5 in accordance with one or more embodiments of an adaptive bus profiler. Generally, any of the functions, methods, procedures, components, and modules described herein can be implemented using hardware, software, firmware (e.g., fixed logic circuitry), manual processing, or any combination thereof. A software implementation of a function, method, procedure, component, or module (e.g., to include the bus profile service 116) represents program code that performs specified tasks when executed on a computing-based processor. Example methods 300, 400, and 500 may be described in the general context of computer-executable instructions. Generally, computer-executable instructions can include software, applications, routines, programs, objects, components, data structures, procedures, modules, functions, and the like.

Figure 3:
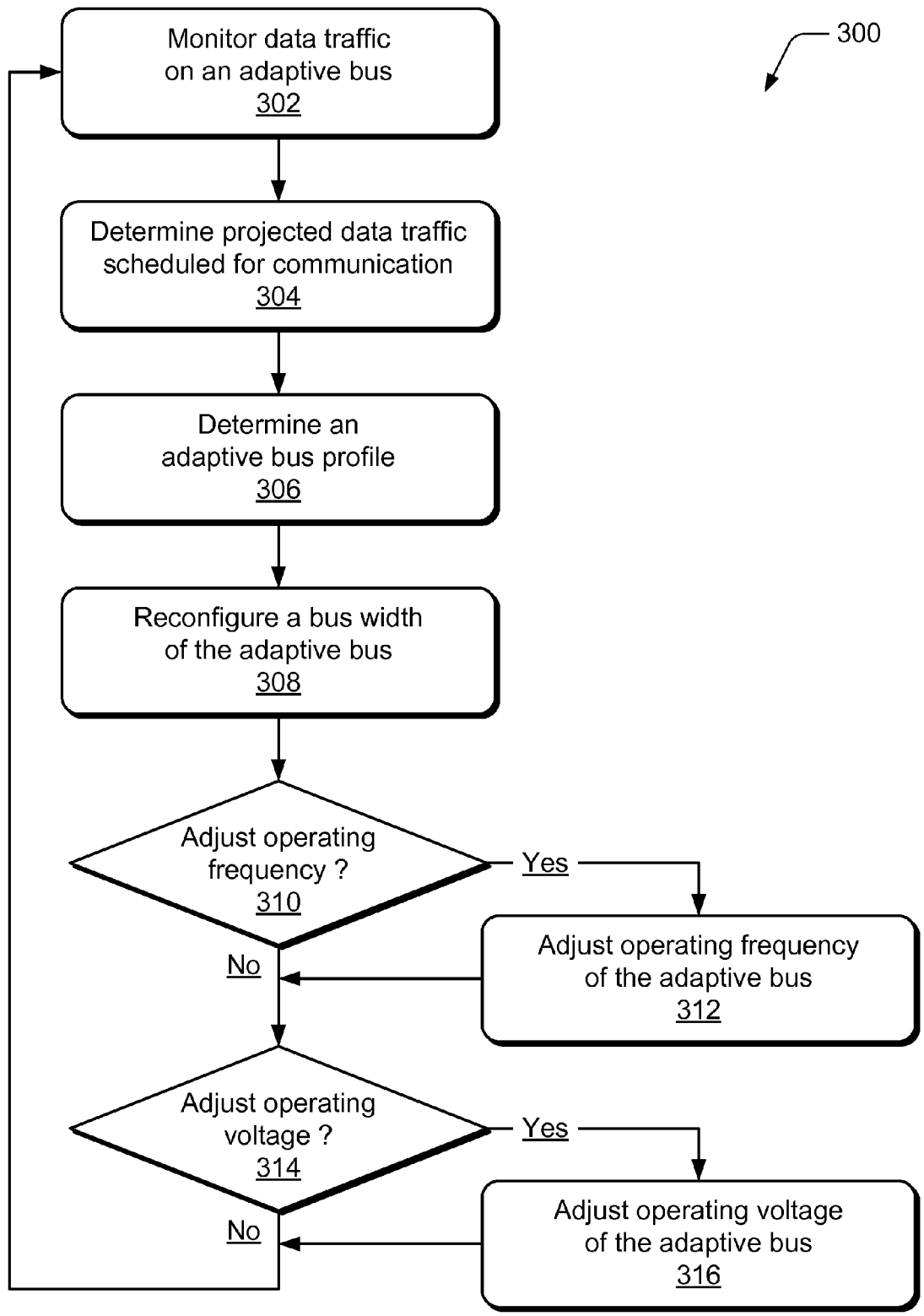
FIGS. 3-5 illustrate example methods of an adaptive bus profiler in accordance with one or more embodiments.

FIG. 3 illustrates example method(s) 300 of an adaptive bus profiler and is described with reference to a bus profile system. The order in which the method is described is not intended to be construed as a limitation, and any number of the described method blocks can be combined in any order to implement the method, or an alternate method.

At block 302, data traffic that is communicated on an adaptive bus is monitored. For example, the I/O trap 216 of bus profile service 116 (FIG. 2) monitors the current data traffic when communicated on adaptive bus 112, and provides the monitored information as an input to the I/O profiler 218.

At block 304, projected data traffic that is scheduled for communication via the adaptive bus is determined. For example, the I/O profiler 218 of bus profile service 116 receives input from an operating system scheduler 222 to determine the projected data traffic that is scheduled for communication via the adaptive bus 112. The scheduler 222 provides parameters for a data transaction schedule that include a quantity of processor threads that are associated with the adaptive bus (e.g., pending and/or active queued threads), a priority of each of the processor threads, and an expected duration of each of the processor threads.

At block 306, an adaptive bus profile is determined based on the data traffic and the projected data traffic. For example, the I/O profiler 218 profiles the adaptive bus 112 and determines an adaptive bus profile of the bus width, operating frequency, and/or operating voltage based on the current data traffic and the projected data traffic on the adaptive bus. At block 308, a bus width of the adaptive bus is reconfigured. For example, the power policy 220 of the bus profile service 116 provides a configuration parameter for the bus width data rate as the I/O change sequence 226 to the kernel I/O control 224, which is then communicated to the state machine 114 and maintained as the bus width parameter with the bus configuration register 210. The state machine 114 then initiates reconfiguring the bus width of the adaptive bus 112 based on the configuration parameter.

At block 310, a determination is made as to whether an operating frequency of the adaptive bus is to be adjusted. If the operating frequency of the adaptive bus is to adjusted, such as when the bus width is increased or decreased (i.e., "yes" from block 310), then at block 312, the operating frequency of the adaptive bus is adjusted accordingly. For example, the power policy 220 of the bus profile service 116 provides a configuration parameter for the operating frequency to the kernel I/O control 224 as the frequency change sequence 228, which is then communicated to the state machine 114 and maintained with the clock configuration register 212. The state machine 114 then adjusts the operating frequency of the adaptive bus 112.

If the operating frequency of the adaptive bus is not adjusted (i.e., "no" from block 310), or continuing from block 312, a determination is made as to whether an operating voltage of the adaptive bus is to be adjusted at block 314. If the operating voltage of the adaptive bus is to be adjusted, such as when the bus width is increased or decreased and/or when the operating frequency is increase or decreased (i.e., "yes" from block 314), then at block 316, the operating voltage of the adaptive bus is adjusted accordingly. For example, the power policy 220 of the bus profile service 116 provides a configuration parameter for the operating voltage to the kernel I/O control 224 as the voltage change sequence 230, which is then communicated to the state machine 114 via the power management IC driver 232. The state machine 114 then adjusts the operating voltage of the adaptive bus 112. If the operating voltage of the adaptive bus is not adjusted (i.e., "no" from block 314), or continuing from block 316, the method can continue at block 302 to again profile the adaptive bus 112.

Figure 4:
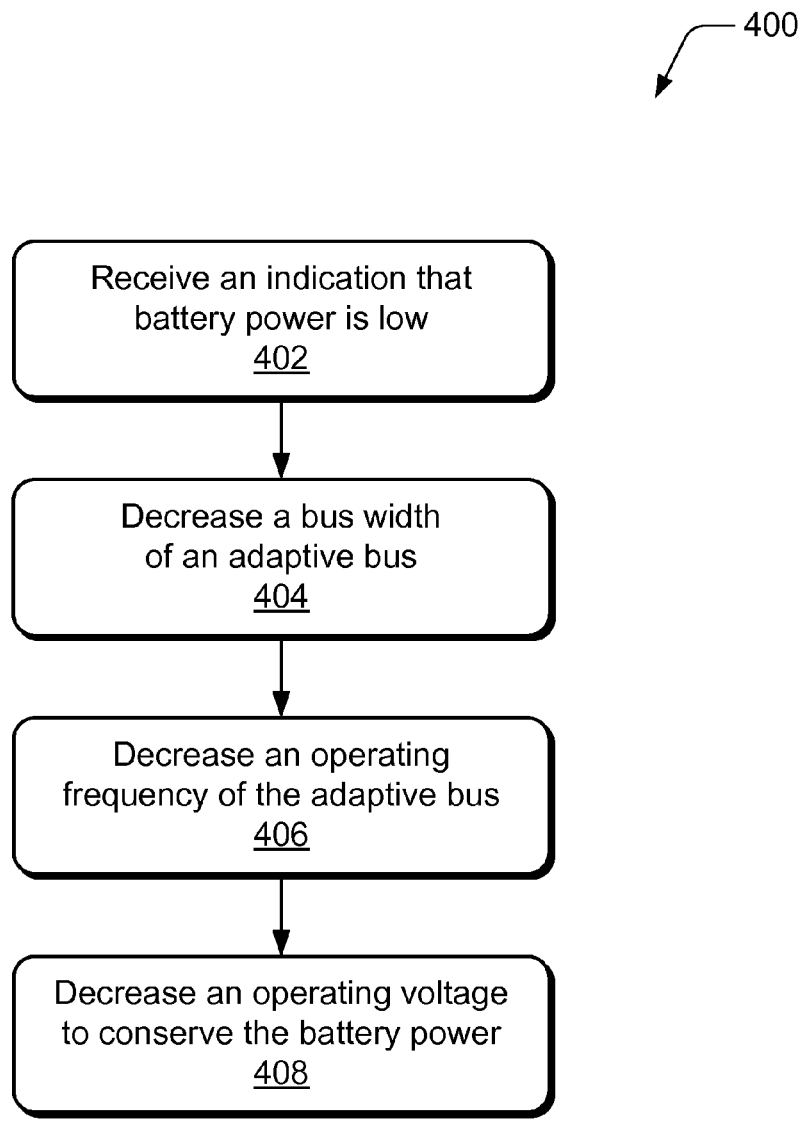

FIG. 4 illustrates example method(s) 400 of an adaptive bus profiler and is described with reference to a bus profile system. The order in which the method is described is not intended to be construed as a limitation, and any number of the described method blocks can be combined in any order to implement the method, or an alternate method.

At block 402, an indication is received that battery power is low. For example, the power policy 220 of the bus profile service 116 (FIG. 2) receives a battery input from the battery driver 236 to indicate a low power condition for a device. The power policy 220 then generates an adaptive bus profile to conserve power in the device.

At block 404, the bus width of an adaptive bus is decreased. For example, the power policy 220 of the bus profile service 116 provides a configuration parameter for a decreased bus width as the I/O change sequence 226 to the kernel I/O control 224, which is then communicated to the state machine 114 and maintained as the bus width parameter with the bus configuration register 210. The state machine 114 then decreases the bus width of the adaptive bus 112.

At block 406, an operating frequency of the adaptive bus is decreased. For example, the power policy 220 of the bus profile service 116 provides a configuration parameter for a decreased operating frequency to the kernel I/O control 224 as the frequency change sequence 228, which is then communicated to the state machine 114 and maintained with the clock configuration register 212. The state machine 114 then decreases the operating frequency of the adaptive bus 112.

At block 408, an operating voltage of the adaptive bus is decreased to conserve the battery power. For example, the power policy 220 of the bus profile service 116 provides a configuration parameter for a decreased operating voltage to the kernel I/O control 224 as the voltage change sequence 230, which is then communicated to the state machine 114 via the power management IC driver 232. The state machine 114 then decreases the operating voltage of the adaptive bus 112 to conserve the battery power.

Figure 5:
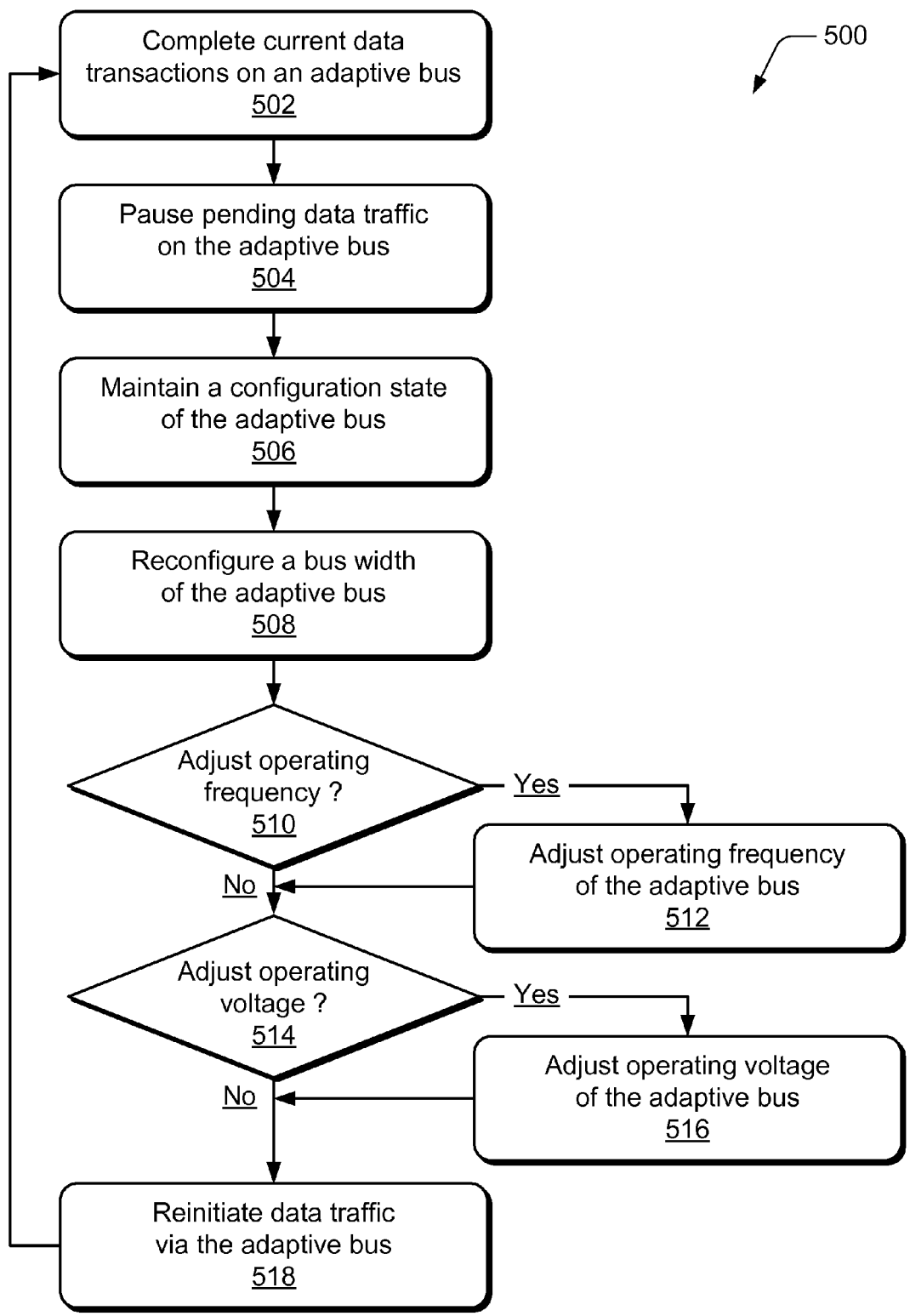

FIG. 5 illustrates example method(s) 500 of an adaptive bus profiler and is described with reference to a state machine of a bus profile system. The order in which the method is described is not intended to be construed as a limitation, and any number of the described method blocks can be combined in any order to implement the method, or an alternate method.

At block 502, current data transactions on an adaptive bus are completed, and at block 504, pending data traffic on the adaptive bus is suspended. For example, the state machine 114 (FIG. 2) allows current data transactions on the adaptive bus 112 to be completed and then holds or suspends pending data transactions in a state machine queue. At block 506, a configuration state of the adaptive bus is maintained. For example, the state machine 114 maintains the configuration state of the adaptive bus 112 with the various parameter registers 214 (e.g., timing parameters, mode information, configuration information, etc.).

At block 508, the bus width is reconfigured. For example, the state machine 114 reconfigures the bus width of the adaptive bus 112 based on the bus width parameter that is maintained with the bus configuration register 210. At block 510, a determination is made as to whether an operating frequency of the adaptive bus is to be adjusted. If the operating frequency of the adaptive bus is to adjusted (i.e., "yes" from block 510), then at block 512, the operating frequency of the adaptive bus is adjusted. For example, the state machine 114 adjusts the operating frequency of the adaptive bus 112 based on an operating frequency parameter that is maintained with the clock configuration register 212.

If the operating frequency of the adaptive bus is not adjusted (i.e., "no" from block 510), or continuing from block 512, a determination is made as to whether an operating voltage of the adaptive bus is to be adjusted at block 514. If the operating voltage of the adaptive bus is to be adjusted (i.e., "yes" from block 514), then at block 516, the operating voltage of the adaptive bus is adjusted accordingly. For example, the state machine 114 adjusts the operating voltage of the adaptive bus 112 based on an operating voltage parameter received from the power management IC driver 232. If the operating voltage of the adaptive bus is not adjusted (i.e., "no" from block 514), or continuing from block 516, the data traffic is reinitiated for communication via the reconfigured adaptive bus at block 518. The method can then continue at block 502 to again reconfigure the adaptive bus 112.

Figure 6:
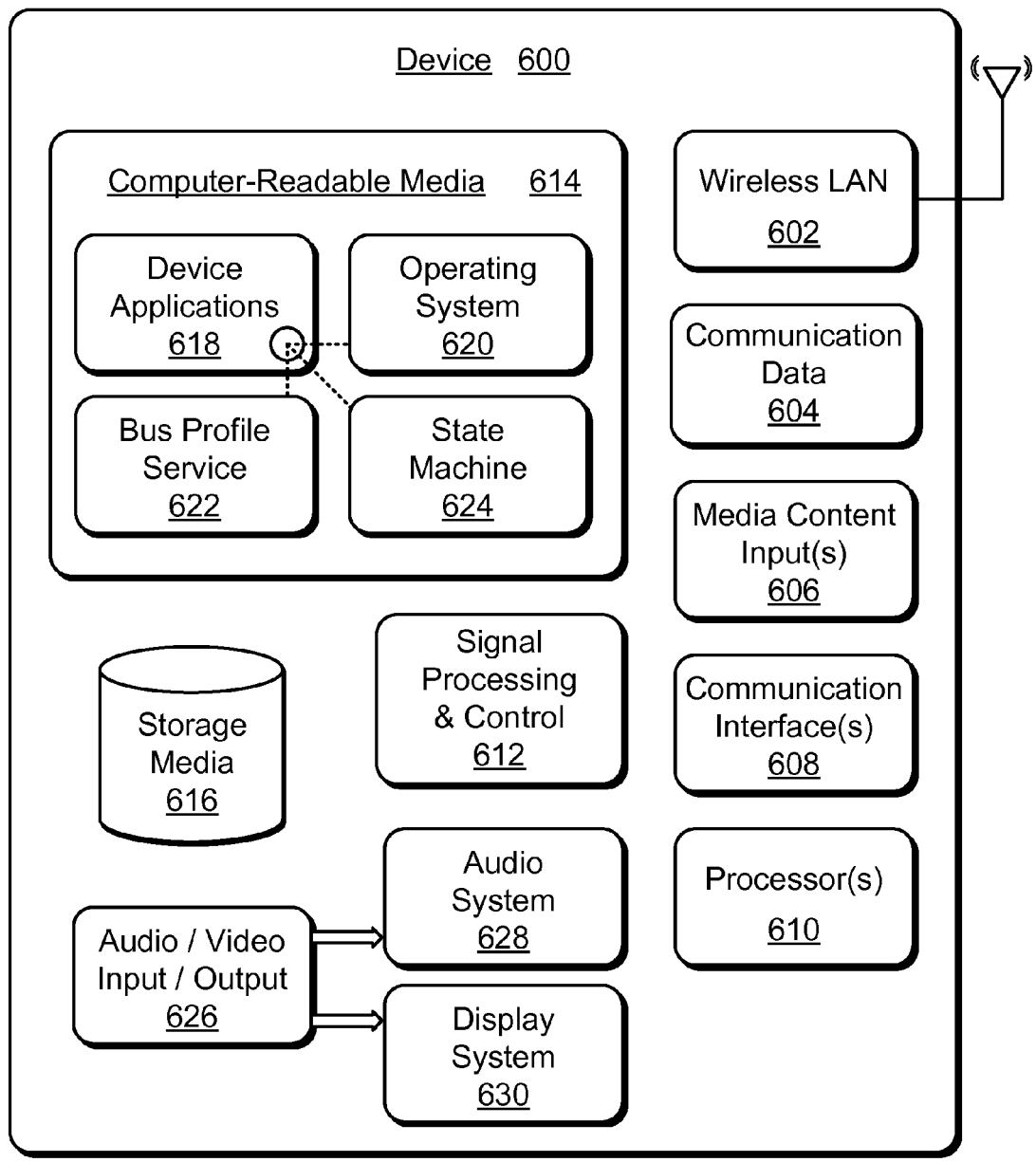
FIG. 6 illustrates various components of an example device that can implement embodiments of an adaptive bus profiler.

FIG. 6 illustrates various components of an example device 600 that can be implemented as any type of device that includes an adaptive bus profile system to implement various embodiments of an adaptive bus profiler. For example, device 600 can be implemented to include the system-on-chip (SoC) 100 shown in FIG. 1 and the bus profile system 200 shown in FIG. 2. In various embodiments, device 600 can be implemented as any one or combination of a media device, computer device, telephone (e.g., cellular, VoIP, Wi-Fi, etc.), high definition television (HDTV), television set-top box, appliance device, gaming device, electronic device, digital camera, GPS navigation device, vehicle, workstation, access point, and/or as any other type of device. The device 600 may also be associated with a user (i.e., a person) and/or an entity that operates the device such that a device describes logical devices that include users, software, and/or a combination of devices.

Device 600 includes wireless LAN (WLAN) components 602, that enable wireless communication of communication data 604 (e.g., received communication data, communication data that is being received, communication data scheduled for broadcast, data packets of the communication data, etc.). Device 600 can also include one or more media content input(s) 606 via which any type of media content can be received, such as music, television media content, and any other type of audio, video, and/or image media content received from a media content source which can be rendered and/or displayed for viewing.

Device 600 can also include communication interface(s) 608 that can be implemented as any one or more of a serial and/or parallel interface, a wireless interface, any type of network interface, a modem, and as any other type of communication interface. A wireless interface enables device 600 to receive control input commands and other data from an input device, such as from a remote control device, a portable computing-based device (such as a cellular phone), or from another infrared (IR) or similar RF input device.

Device 600 can also include one or more processor(s) 610 (e.g., any of microprocessors, controllers, and the like) which process various computer-executable instructions to control the operation of device 600, to communicate with other electronic and computing devices, and to implement embodiments of an adaptive bus profiler. Alternatively or in addition, device 600 can be implemented with any one or combination of hardware, firmware, or fixed logic circuitry that is implemented in connection with signal processing and control circuits which are generally identified at 612.

Device 600 can include computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 600 may also include a mass storage media device 616.

Computer-readable media 614 provides data storage mechanisms to store the communication data 604, as well as various device applications 618 and any other types of information and/or data related to operational aspects of device 600. For example, an operating system 620 can be maintained as a computer application with the computer-readable media 614 and executed on processor(s) 610. The device applications 618 can also include a bus profile service 622 and/or a state machine 624 when device 600 is implemented to include a bus profile system. In this example, the device applications 618 are shown as software modules and/or computer applications that can implement various embodiments of an adaptive bus profiler.

Device 600 can also include an audio and/or video input/output system 626 that provides audio data to an audio rendering system 628 and/or provides video data to a display system 630. The audio rendering system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, audio rendering system 628 and/or the display system 630 can be implemented as external components to device 600. Alternatively, the audio rendering system 628 and/or the display system 630 can be implemented as integrated components of the example device 600.

Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of an adaptive bus profiler have been described in language specific to features and/or methods, it is to be understood that the subject of the appended claims is not necessarily limited to the specific features or methods described. Rather, the specific features and methods are disclosed as example implementations of an adaptive bus profiler.

The invention claimed is:

1. An adaptive bus profile system, comprising:
 a bus profile service configured to:
  monitor data traffic communicated on an adaptive bus;
  determine, based on data transaction parameters of an operating system scheduler, the data transaction parameters including a quantity of processor threads that are associated with the adaptive bus and a priority of each of the processor threads, projected data traffic that is scheduled for communication via the adaptive bus;
  determine an adaptive bus profile based on the data traffic and the projected data traffic; and
 a state machine configured to initiate reconfiguring a bus width of the adaptive bus based on the adaptive bus profile.

2. An adaptive bus profile system as recited in claim 1, wherein the bus profile service is further configured to determine an operating frequency of the adaptive bus based on the bus width.

3. An adaptive bus profile system as recited in claim 1, wherein the bus profile service is further configured to determine an operating voltage of the adaptive bus based on the bus width.

4. An adaptive bus profile system as recited in claim 1, wherein the bus profile service is further configured to:
 receive an indication that battery power is low; and
 determine the adaptive bus profile to include a decreased bus width of the adaptive bus.

5. An adaptive bus profile system as recited in claim 4, wherein the bus profile service is further configured to determine the adaptive bus profile to include:
 a decreased operating frequency of the adaptive bus; and
 a decreased operating voltage of the adaptive bus to conserve the battery power.

6. An adaptive bus profile system as recited in claim 5, wherein the state machine is further configured to:
 decrease the bus width of the adaptive bus;
 decrease the operating frequency of the adaptive bus; and
 decrease the operating voltage of the adaptive bus to conserve the battery power.

7. An adaptive bus profile system as recited in claim 1, wherein the bus profile service is further configured to determine the adaptive bus profile to include:
 an increased bus width of the adaptive bus;
 an increased operating frequency of the adaptive bus; and an adjusted operating voltage of the adaptive bus based on the increased bus width and the increased operating frequency.

8. An adaptive bus profile system as recited in claim 1, wherein the bus profile service is further configured to determine the adaptive bus profile to include:
   a decreased bus width of the adaptive bus;
   a decreased operating frequency of the adaptive bus; and
   an adjusted operating voltage of the adaptive bus based on the decreased bus width and the decreased operating frequency.

9. An adaptive bus profile system as recited in claim 1, wherein the state machine is further configured to:
   maintain a configuration state of the adaptive bus;
   reconfigure the bus width, an operating frequency, and an operating voltage of the adaptive bus; and
   reinitiate the data traffic for communication via the adaptive bus as reconfigured.

10. An adaptive bus profile system as recited in claim 1, wherein the processor threads that are associated with the adaptive bus are pending threads or active queued threads.

11. A method comprising:
   monitoring data traffic that is communicated on an adaptive bus;
   determining, based on data transaction parameters of an operating system scheduler, the data transaction parameters including a priority and an expected duration of each processor thread associated with the adaptive bus, projected data traffic that is scheduled for communication via the adaptive bus;
   determining an adaptive bus profile based on the data traffic and the projected data traffic; and
   initiating reconfiguration of a bus width of the adaptive bus based on the adaptive bus profile.

12. A method as recited in claim 11, further comprising:
   adjusting an operating frequency of the adaptive bus based on the bus width; and
   adjusting an operating voltage of the adaptive bus based on the bus width and the operating frequency as adjusted.

13. A method as recited in claim 11, further comprising:
   decreasing the bus width of the adaptive bus in response to an indication that battery power is low;
   decreasing an operating frequency of the adaptive bus; and
   decreasing an operating voltage of the adaptive bus to conserve the battery power.

14. A method as recited in claim 11, further comprising:
   increasing the bus width of the of the adaptive bus;
   increasing an operating frequency of the adaptive bus; and
   adjusting an operating voltage of the adaptive bus based on the bus width increase and the operating frequency increase.

15. A method as recited in claim 11, further comprising:
   decreasing the bus width of the adaptive bus;
   decreasing an operating frequency of the adaptive bus; and
   adjusting an operating voltage of the adaptive bus based on the bus width decrease and the operating frequency decrease.

16. A method as recited in claim 11, further comprising initiating a state machine to:
   maintain a configuration state of the adaptive bus;
   reconfigure the bus width, an operating frequency, and an operating voltage of the adaptive bus; and
   reinitiate the data traffic for communication via the adaptive bus as reconfigured.

17. An adaptive bus profile system configured to:
   monitor data traffic that is communicated on an adaptive bus;
   determine, based on data transaction parameters of an operating system scheduler, the data transaction parameters including a priority of each active and pending queued processor thread associated with the adaptive bus, projected data traffic that is scheduled for communication via the adaptive bus;
   determine an adaptive bus profile based on the data traffic and the projected data traffic; and
   initiate reconfiguring a bus width of the adaptive bus based on the adaptive bus profile.

18. An adaptive bus profile system as recited in claim 17, further configured to:
   adjust an operating frequency of the adaptive bus based on the bus width; and
   adjust an operating voltage of the adaptive bus based on the bus width and the operating frequency as adjusted.

19. An adaptive bus profile system as recited in claim 17, further configured to:
   decrease the bus width of the adaptive bus in response to an indication that battery power is low;
   decrease an operating frequency of the adaptive bus; and
   decrease an operating voltage of the adaptive bus to conserve the battery power.

20. An adaptive bus profile system as recited in claim 17, further configured to:
   increase the bus width of the of the adaptive bus;
   increase an operating frequency of the adaptive bus; and
   adjust an operating voltage of the adaptive bus based on the bus width increase and the operating frequency increase.

21. An adaptive bus profile system as recited in claim 17, further configured to:
   decrease the bus width of the adaptive bus;
   decrease an operating frequency of the adaptive bus; and
   adjust an operating voltage of the adaptive bus based on the bus width decrease and the operating frequency decrease.

22. An adaptive bus profile system as recited in claim 17, further configured to initiate a state machine to:
   maintain a configuration state of the adaptive bus;
   reconfigure the bus width, an operating frequency, and an operating voltage of the adaptive bus; and
   reinitiate the data traffic for communication via the adaptive bus as reconfigured.

* * * * *